Dec. 10, 1929.  S. B. HASELTINE  1,738,703
CAR CONSTRUCTION
Filed April 27, 1928  2 Sheets-Sheet 1
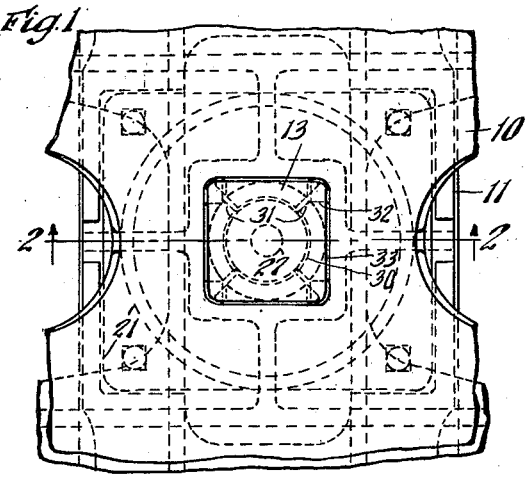
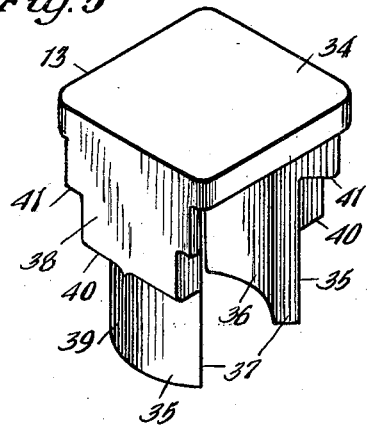
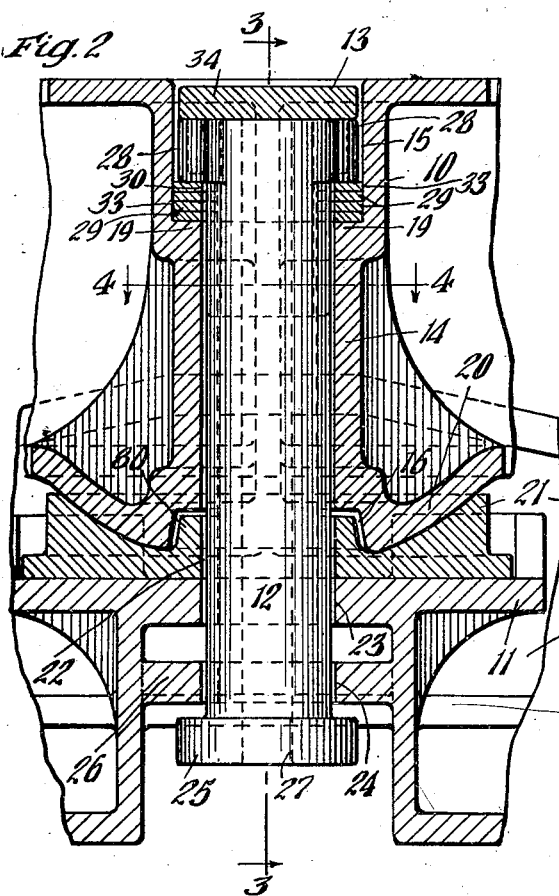
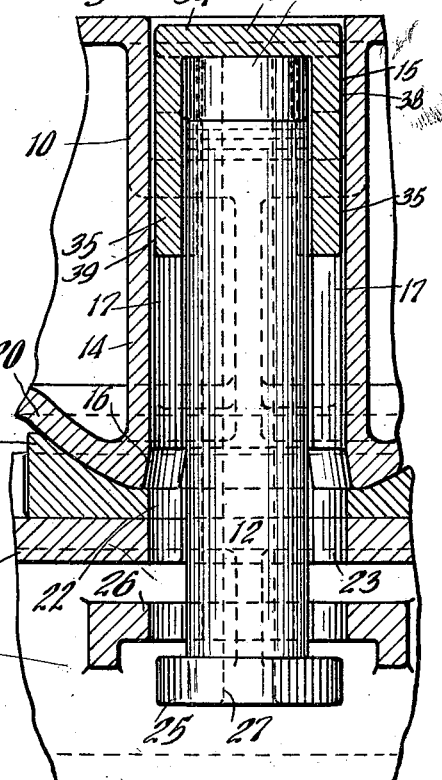
Witness
Wm. Geiger
Inventor
Stacy B. Haseltine
By Joseph Harris
His Atty.

Dec. 10, 1929.  S. B. HASELTINE  1,738,703
CAR CONSTRUCTION
Filed April 27, 1928   2 Sheets-Sheet 2
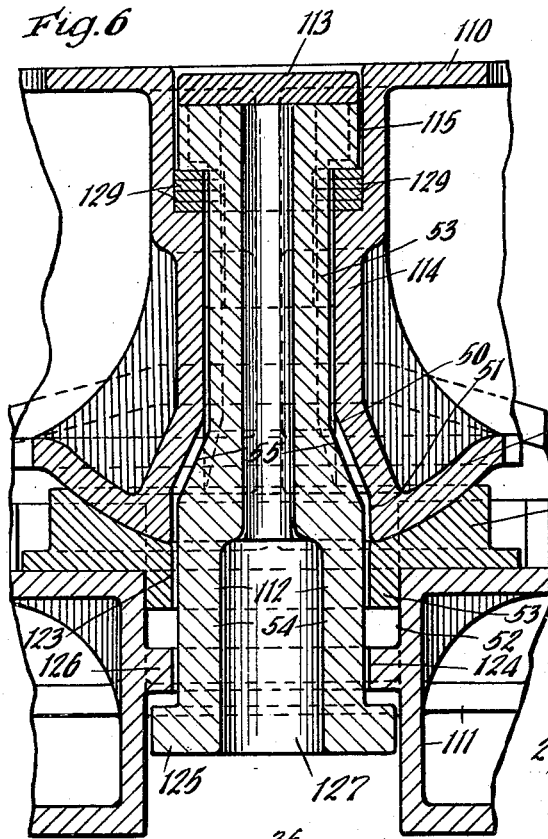
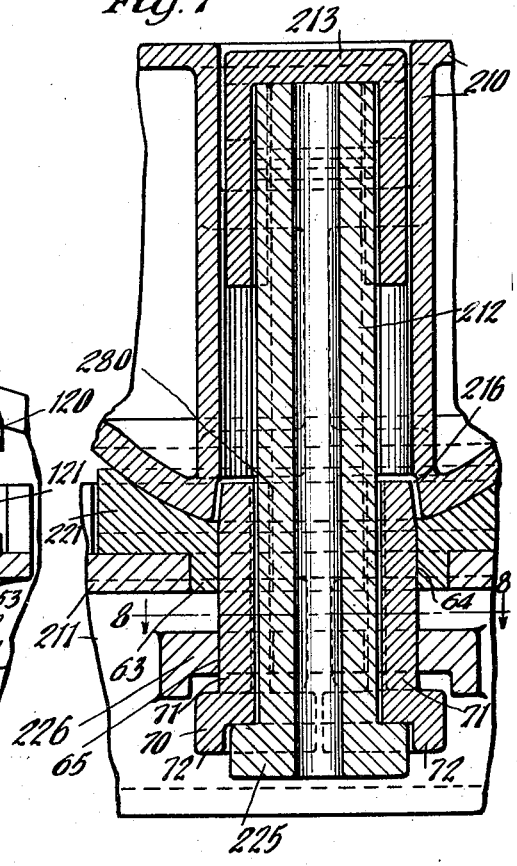
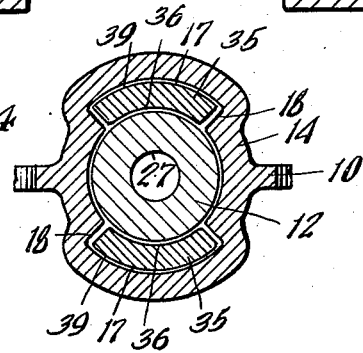
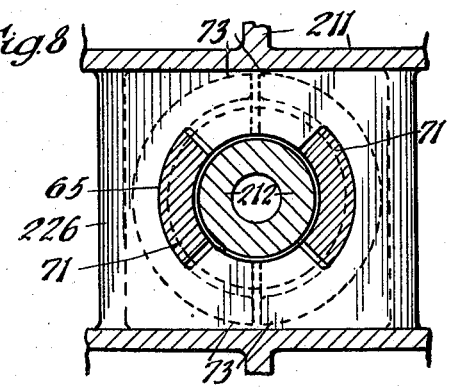
Inventor
Stacy B. Haseltine
Witness
Wm. Geiger
By Joseph Harris
His Atty.

Patented Dec. 10, 1929

1,738,703

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

CAR CONSTRUCTION

Application filed April 27, 1928. Serial No. 273,185.

This invention relates to improvements in car construction, and more particularly means for preventing the separation of body and truck bolsters of passenger cars.

One object of my invention is to provide a combined locking and center pin arrangement for car bolsters which will be of substantial construction throughout and presenting a large cross sectional area to minimize the possibility of shearing off or of breaking under tension strains when the car is in collision, to thereby maintain the connection between the trucks and body and thus prevent telescoping.

Another object of my invention is to provide a one-piece, combined locking center pin of substantial cross section throughout its length, and which may be readily inserted and removed when desired, and, when in position, is held against turning with respect to one of the bolsters.

Another and more specific object of my invention is to provide arrangement of the character indicated, wherein adjustments may be made by means of shims or equivalents, to take up for wear on the center bearing plates so as to always maintain the efficiency of the connection between the bolsters.

Other objects of the invention will more clearly appear from the description and claims hereinafter following.

In the drawings forming a part of this specification, Figure 1 is a top plan view of portions of body and truck bolsters of a passenger car, showing my improvements in connection therewith, parts being broken away as unessential to the disclosure. Figure 2 is an enlarged, vertical, sectional view, corresponding to the line 2—2 of Figure 1. Figure 3 is a vertical, sectional view at right angles to Figure 2 and corresponding to the line 3—3 of Figure 2. Figure 4 is a horizontal, sectional view, corresponding to the line 4—4 of Figure 2. Figure 5 is a detailed perspective of the locking plate used with my improvements. Figure 6 is a view similar to Figure 2, illustrating another embodiment of my invention. Figure 7 is a view similar to Figure 3, illustrating a still further embodiment of the invention. And Figure 8 is a horizontal, sectional view of the form illustrated in Figure 7 and corresponding to the line 8—8 thereof.

In said drawings, and referring first to the construction illustrated in Figures 1 to 5, inclusive, 10 indicates generally the body bolster of the car, 11 the truck bolster, 12 the combined locking and center pin, and 13 the locking plate associated with the pin.

The body bolster 10 may be of any suitable or desirable construction and is provided with a tubular center or king pin section 14 which merges into a rectangular pocket 15 at the upper end and into a truncated conical recess 16 at the lower end.

The center pin section 14 is additionally provided with diametrically opposed, vertically extending grooves 17, each of which approximates 90° in extent, with radially disposed end walls 18—18, as best indicated in Figure 4. With the formation described, it is evident that horizontal, diametrically disposed, upwardly facing shoulders 19—19 are formed at the bottom of the rectangular pocket 15, said shoulders 19 corresponding approximately to the shape of the groove 17 but offset 90° with respect to the latter. The body bolster 10 is also shown formed with an integral center bearing plate section 20 which cooperates with a corresponding truck center bearing plate 21, suitably secured to the truck bolster 11. The plate 21 has a central aperture 22 conforming to the aperture through the body bolster, and an upstanding male flange 80 seating in the female recess 16.

The truck bolster 11 is formed with correspondingly shaped openings 23 and 24 in the top main web and lower intermediate web, as clearly shown in Figures 2 and 3.

The pin 12 has a cylindrical shank of the same cross section throughout its length and is provided at its lower end with an annular flange 25 constituting a head which is positioned beneath the partition 26 and is adapted to engage with the under-face of the latter upon upward movement of the pin when the body and truck bolsters separate. Preferably, the clearance allowed between the flange or head 25 and the partition 26 will be less than the depth of the male flange 80 of the center bearing plate 21, so that the center bearing plates cannot become disassembled unless there is failure of the pin 12.

The pin 12 may be cored, as indicated at 27, to lessen the weight and amount of material required and facilitate its manufacture, the coring being kept reduced sufficiently as not to materially affect the strength value of the pin.

At its upper end, the pin 12 is shown provided with diametrically opposed, laterally extending, heavy, thick flanges 28—28 of an outline corresponding to the grooves 17 and just sufficiently smaller than the grooves as to permit passage of the head flanges 28 longitudinally therethrough. As will be understood, the pin 12 is inserted from the bottom with the lateral flanges 28 aligned with the longitudinally extending grooves of the center pin openings and, when the flanges 28 are above the shoulders 19 and the shims 29, when any of the latter are used, the pin is then given a 90° turn, so as to bring the flanges 28 above the shoulders 19.

The shims 29, which may be of any desired number or which may be omitted entirely if desired, are of like construction and each preferably extends through an arc of approximately 90°, as shown in Figure 1, and has an inner curved edge 30, radially extending edges 31, squared ends 32, and a straight outer face 33, so that, when the shims are in place, they substantially cover the shoulders 19 while leaving two arcuate spaces for the passage of the pin flanges 28 before the latter are turned and rested upon the shims.

The locking plate 13 is inserted from the top after the pin 12 has been entered and turned to its proper operative position. Said plate 13, as best shown in Figure 5, has a rectangular top section 34 corresponding to the shape of the pocket 15, and two depending arms or flanges 35—35. Each of the flanges 35 is provided on its inner side with a circular face 36 of approximately the same radius as that of the surface of the pin 12, the flanges 35 having substantially radially disposed, diverging edges 37—37. Each flange 35, at the upper portion thereof, has a flat outer surface 38 extending approximately half the length of the flange, and the surface is then rounded, as indicated at 39, thus providing downwardly facing shoulders 40—40 and above which are other downwardly facing shoulders 41—41.

The lower sections of the flanges 35 having the inner and outer cylindrical faces 36 and 39 are adapted to extend into the offset grooves 17 of the body bolster, as indicated in Figure 4, and hence the plate 13 will be thereby prevented from turning. The depending flanges 35 are obviously designed to straddle the upper end of the pin 12 and pass between the laterally extending head or flange sections 28 thereof, thereby preventing the pin 12 from turning with reference to the body bolster when the locking plate 13 is in position. The portions of the flanges 35 below the shoulders 41 and above the shoulders 40 will enter between the ends of the shims 29.

With the construction described, it will be evident that the pin has a shank of very strong and substantial construction, without any necked-in or reduced sections, thereby presenting great strength against any tendency to shear the same and also against tension when the bolsters tend to separate. Further, while the pin is held against rotation with respect to the body bolster, nevertheless, the truck bolster is free to turn with respect to the pin. Should wear occur on the center bearing faces, it is evident that more or less of the shims may be used to compensate therefor and to leave the desired clearance between the lower head 25 of the pin and the opposed bearing shoulder sections of the truck bolster, to thus limit the permissible vertical play of the pin to the desired amount at all times.

Referring next to the construction illustrated in Figure 6, the body bolster is indicated at 110, the truck bolster at 111, the improved pin at 112, and the locking plate at 113.

The body bolster is provided with a king pin or center pin section 114 of the same cross sectional contour as the section 14 of the first described form, the center pin section, however, in the modification of Figure 6, being downwardly flared, as indicated at 50, and thence terminating in a true cylindrical section 51. The rectangular opening 115 at the upper end, the locking plate 113, the shims 129, and the formation of the upper end of the pin 112 are the same as in the form first described.

The truck bolster 111 is recessed on its upper face, as indicated at 52, to receive a depending flange 53 of the truck center bearing plate 121. The latter cooperates with the body bolster center bearing plate section 120, but in this modification no male and female formations of the center bearing plates is employed. Furthermore, the opening 123 in the truck center plate 121 and the opening 124 in the horizontal partition of the truck bolster are truly circular throughout, but of larger diameter than the upper shank portion 53 of the pin 112, and of sufficiently large diameter to permit the passage therethrough of the upper headed end of the pin.

In this modification, the pin 112 has the lower portion of the shank of an enlarged diameter, as indicated at 54, the latter section being merged with the upper main section 53 by a truncated conical section 55, the latter conforming to the corresponding truncated conical section 50 of the body bolster. The pin 112 has an annular flange or head 125 at its lower end, adapted to be limited in its upward movement by the partition 126 of the truck bolster. The pin may be cored, as indicated at 127.

In this modification, the pin is inserted upwardly through the openings 124 and 123, and the lateral flanges at the top of the pin, while the latter is in one position, are passed up through the opening in the body bolster and given a quarter turn and the locking plate applied, as will be understood.

It will be observed that a larger cross section of the pin is presented at the plane of contact between the center bearing plates, thus affording greater strength against shear, and, also, it will be observed that a complete bearing of 360° is obtainable between the lower head 125 of the pin and the partition 126 in the event the body and truck bolsters start to separate.

In the form of the invention illustrated in Figures 7 and 8, the body bolster is indicated at 210, the truck bolster at 211, the pin at 212, and the locking plate at 213. In this modification, the pin 212, the locking plate 213, and the body bolster are the same as the corresponding parts of the first described modification, and detailed description of these parts is deemed unnecessary.

The truck center bearing plate 221 is similar to the center bearing plate 121, in that it has a depending flange 63 seated within a recess of the truck bolster, and similar to the bearing plate 21 in that it has two diametrically disposed, upstanding male flange sections 280 positioned within the female recess 216. The plate 221 has the central passage 64 thereof of the same cross section and contour as the opening 22 of the plate 21 first described, and, similarly, the opening 65 in the partition 226 of the truck bolster corresponds in size and contour to the corresponding opening 24 of the first described form.

In the construction of Figures 7 and 8, I employ two additional members in the nature of fillers, indicated at 70—70. Each of the members 70 is formed with an upstanding flange 71, constituting a section of an annulus and adapted to fit within the aligned grooves or recesses in the partition 226 and center bearing plate 221.

The flanges 71 are of such a length that the upper ends thereof project into the female recess 216 of the body bolster and are positioned between the male flange sections 280 of the truck bolster center plate 221. At the lower ends, each of the members 70 is formed with a laterally offset arcuate flange 72 embracing the head 225 of the pin, said flanges 72 preferably being extended circumferentially, as indicated at 73—73 in Figure 8, beyond the edges of the upstanding flanges 71 so that each flange 72—73 is of approximately 180° in extent. In this manner, the annular head or flange 225 of the pin is provided with substantially a 360° shoulder bearing on the under sides of the members 70, and the flanges 72—73 of the latter in turn have a substantially 360° shoulder bearing against the under side of the partition 226.

In assembling the construction shown in Figures 7 and 8, the pin is entered the same as the pin 12 of the first described form, and when the pin 212 is partially inserted the members 70 are applied thereto and entered through the recesses provided therefor, it being evident that the pin 212 may be given a quarter turn within the members 70, as well as within the center pin section of the body bolster.

Considering the combined locking center pin of Figure 7 as comprised of the pin proper 212 and the members 70, it is evident that a larger cross sectional area is provided to resist shear in the meeting plane of the center bearing plates than in the case of the construction shown in the first modification.

When I have herein shown and described what I consider the preferred manner of carrying out my invention, the same is merely illustrative and I contemplate all changes and modifications which come within the scope of the claims appended hereto.

I claim:

1. In car construction, the combination with body and truck bolsters having aligned center pin openings, each bolster being provided with a shoulder adjacent its opening; of a center pin having a head at each end, the shape of one of said heads and the cross section of the openings being such that it may be inserted therethrough while in one position, but is prevented from passing therethrough when given a partial turn, the shank portion of said pin, adjacent said head, being of a diameter corresponding to the diameter of the pin opening adjacent thereto; and removable means co-operating with said pin to prevent turning thereof relative to the bolster with which said head co-operates.

2. In car construction, the combination with body and truck bolsters having aligned center pin openings, each bolster being provided with a shoulder adjacent its opening; of a center pin having a head at each end, the shape of one of said heads and the cross section of the openings being such that it may be inserted therethrough while in one position, but is prevented from passing therethrough when given a partial turn, the shank portion of said pin, adjacent said head, being of a diameter corresponding to the diameter of the pin opening adjacent thereto; and a removable plate co-operating with said head and corresponding adjacent bolster to prevent turning of the pin with respect to said bolster.

3. In car construction, the combination with body and truck bolsters having aligned center pin openings and each provided with a shoulder adjacent its opening; of a center pin having a head at its lower end and a head at its upper end, the cross section of the pin opening in the body bolster and the shape of the upper head being such as to permit insertion when the pin is in one angular position and when turned will prevent passage of said head through said body bolster opening; and removable means preventing turning of the pin with respect to the body bolster.

4. In car construction, the combination with body and truck bolsters having aligned center pin openings and each provided with a shoulder adjacent its opening; of a center pin having a head at its lower end and a head at its upper end, the cross section of the pin opening in the body bolster and the shape of the upper head being such as to permit insertion when the pin is in one angular position and when turned will prevent passage of said head through said body bolster opening; and a removable locking plate co-operable with the upper head of the pin and adjacent portion of the body bolster to prevent turning of the pin with respect to the body bolster.

5. In car construction, the combination with body and truck bolsters having aligned center pin openings; of a center pin having a head at each end, the opening in one bolster and one of said heads having co-operating bayonet joint formations permitting passage of said head through said opening, said head locking the pin against endwise removal with respect to the bolster when said pin is given a partial turn; and locking means engageable with the bayonet joint formations of the pin and bolster for holding the pin against rotation with respect to said bolster.

6. In car construction, the combination with body and truck bolsters having aligned center pin openings; of a center pin having a head at each end, the opening in one bolster and one of said heads having co-operating bayonet joint formations; means co-operable with the bayonet joint formations of the pin and bolster for holding the pin against rotation with respect to said bolster; and sectional shims interposed between the bayonet joint formation of the pin and adjacent shoulders of the bolster.

7. In car construction, the combination with body and truck bolsters having aligned passages, together defining a center pin opening, said opening being of enlarged diameter at the meeting plane of the center bearing plates; of center pin means having an effective enlarged diameter section at said meeting plane of the center bearing plates; and means for retaining the center pin means in place.

8. In car construction, the combination with body and truck bolsters having aligned passages, together defining a center pin opening, said opening being of enlarged diameter at the meeting plane of the center bearing plates; of center pin means having an effective enlarged diameter section at said meeting plane of the center bearing plates, said center pin means and one of the bolsters having co-operating bayonet joint formations, to thereby prevent accidental separation thereof; and means for retaining said center pin means against rotation with respect to the bolster having the bayonet joint formation.

9. In car construction, the combination with body and truck bolsters having aligned center pin openings, one of said bolsters having a rectangular pocket merging with its center pin opening, the latter having opposed, longitudinally extending grooves; of a combined locking center pin having a headed end adapted to be entered through the opening of said bolster having the pocket and to be positioned within the pocket and rotatable therein; and a locking plate having spaced flanges arranged to straddle said head of the pin, portions of said flanges being arranged to enter said grooves, whereby to prevent turning of the plate and pin with reference to said bolster.

10. In car construction, the combination with body and truck bolsters, the body bolster having a center pin opening and a noncircular pocket at the top thereof, said opening having bayonet joint groove formations; a locking center pin having the upper end thereof formed with a corresponding bayonet joint formation and adapted to be entered through the body bolster; and a U-shaped locking plate arranged to straddle the upper end of said pin and having portions adapted to enter the bayonet joint forming grooves of the body bolster.

11. In car construction, the combination with body and truck bolsters having alined center pin openings, the wall of the opening of one of said bolsters having longitudinally extending grooves; of a combined locking center pin having a headed end adapted to be entered through the opening of said last named bolster; and a locking member having arms arranged to straddle said head of the pin to prevent relative rotation of the pin and locking member, portions of said arms being arranged to engage in said grooves to prevent turning of the locking member and pin with respect to said last named bolster, said pin at the other end thereof having shouldered engagement with the other bolster.

12. In car construction, the combination with body and truck bolsters having alined center pin openings, each bolster being provided with a shoulder adjacent its opening; of a center pin having a shank of substantially uniform cross section throughout and having enlargements at opposite ends forming heads, one of said heads being defined by laterally projecting arcuate spaced flanges, the shape of said last named head and the cross section of the opening adjacent one of said shoulders being such that said head may be inserted therethrough while in one position, but is prevented from passing therethrough when given a partial turn so as to register the flanges of the head with said last named shoulder, the head at the other end of the pin cooperating with the shoulder of the corresponding bolster to prevent removal of the pin.

13. In car construction, the combination with body and truck bolsters having alined center pin openings, each bolster being provided with a shoulder adjacent its opening; of a center pin having enlargements at opposite ends forming heads, one of the heads cooperating with the shoulder of one of the bolsters to prevent removal of the pin in one direction and the other head cooperating with the other bolster to prevent removal of the pin in a reverse direction, said last named head comprising a laterally projecting arcuate flange, the shape of said last named head and the cross section of the opening adjacent said last named shoulder being such that the flange forming the head may be inserted therethrough while in one position but is prevented from passing therethrough when given a partial turn to engage said cooperating shoulder; and a removable plate cooperating with one of said members and the corresponding adjacent bolster to prevent turning of the pin with respect to said bolster.

In witness that I claim the foregoing I have hereunto subscribed my name this 25th day of April, 1928.

STACY B. HASELTINE.